United States Patent [19]
Bushnell

[11] Patent Number: 5,459,506
[45] Date of Patent: Oct. 17, 1995

[54] ENHANCED PAY PER VIEW SYSTEM

[75] Inventor: William J. Bushnell, St. Charles, Ill.

[73] Assignee: AT&T Corp., Murray Hill, N.J.

[21] Appl. No.: 174,111

[22] Filed: Dec. 28, 1993

[51] Int. Cl.$^6$ .................................................. H04N 7/173
[52] U.S. Cl. ................... 348/7; 455/4.2; 348/12
[58] Field of Search ................ 348/6, 7, 10, 12, 348/8; 455/3.1, 4.1, 4.2; 358/85, 86; H04N 7/14, 7/16, 7/10, 7/173, 7/15

[56] References Cited

U.S. PATENT DOCUMENTS

| | | | |
|---|---|---|---|
| 4,302,771 | 11/1981 | Gargini | 455/4.2 |
| 4,616,256 | 10/1986 | Boutmy | 348/6 |
| 4,763,191 | 8/1988 | Gordon et al. | 358/86 |
| 4,890,320 | 12/1989 | Monslow et al. | 455/4.2 |
| 5,172,413 | 12/1992 | Bradley et al. | 348/7 |
| 5,191,459 | 3/1993 | Thompson et al. | 359/133 |

Primary Examiner—David E. Harvey
Attorney, Agent, or Firm—Jack R. Penrod

[57] ABSTRACT

A pay-per-view system for a cable television network that gives the subscribers a greatly enhanced variety of viewing choices. The system uses an interactive set top box for the subscribers to forward their choices for viewing. Since the pay-per-view viewing choices are made interactively from a wide variety of selections, the chances of a subscriber finding something he or she wants to pay to watch are considerably improved. The interactive choices are forwarded to an intelligent video switch. This switch takes the first N programs requested and assigns N programmable selectors to select N programs from a much greater number (M) of possible programs and switches these N programs onto N frequency multiplexed channels on a standard television cable. If the M possible programs are delivered to the video switch in ATM packets, the programmable selectors are ATM packet demultiplexers, and if the M possible programs are delivered to the video switch as frequency multiplexed channels, the programmable selectors are programmable radio frequency tuners. This system will make the subscribers happier because it gives them more choices for viewing, and will make the pay-per-view operators happier because it should lead to increased revenue from an increase in the number of pay-per-view programs watched.

7 Claims, 7 Drawing Sheets

ENHANCED PAY PER VIEW SYSTEM

FIELD OF THE INVENTION

This invention relates to cable television systems and more particularly, to pay-per-view systems operating within cable television systems.

BACKGROUND OF THE INVENTION

Cable television systems typically have a capacity of approximately 100 individual frequency channels. These 100 frequency channels are analog channels, meaning that the video color and intensity information of each channel is a linear function of its respective vestigial sideband reduced carrier signal. Most of these channels are filled with full time programming of commercial television, pay television, and public interest television. Some of the few channels that remain are often used for a system known as pay-per-view.

Pay-per-view, as its name implies, is a service where the viewer of a program, typically pays for viewing a more or less single item which lasts for a predetermined period. Most pay-per-view programs last for just a few hours. Some sporting events, such as the Olympics, may last more than one day but are still billed as a single program. This is unlike a pay television channel where a subscriber pays a flat monthly fee and often does not know or watch all of the programs that are on the pay television channel each month. An example of a pay-per-view system is described in U.S. Pat. No. 4,763,191 entitled DIAL-UP TELEPHONE NETWORK EQUIPMENT FOR REQUESTING AN IDENTIFIED SELECTION, issued to Gordon et al, and assigned to the assignee hereof.

A pay-per-view system typically includes one program schedule channel and one or more viewing channels. The pay-per-view program schedule channel gives the starting times of the upcoming pay-per-view programs, the pay-per-view viewing channel in which the program will be carried, the viewing fee and ordering information. The program schedule channel may give some type of preview of the programs also. Each pay-per-view program is scheduled to start at a specific time on a specific channel. The program schedule for each pay-per-view viewing channel, and the schedule for the pay-per-view program schedule channel are predetermined, e.g. they are determined the previous day or the previous week. The subscriber has the choice of selecting one of the predetermined pay-per-view programs and incurring the viewing fee or not selecting pay-per-view, not being able to watch the program, and not incurring any fee. The subscriber does not have any other choices with respect to the pay-per-view programming distributed via the cable television system.

A problem that has plagued the pay-per-view service is scheduling programs that viewers will pay to watch. The pay-per-view diviners have not forecasted very well which programs the subscribers want. As a result, there are typically only four or five pay-per-view channels on a given neighborhood cable television system. Often these are divided up among recent movies, live events, and mature programming as the predetermined choices. The fact that there are still empty channels available on most community cable television systems indicates that pay-per-view revenues could grow if there was a better way to match up the programs that are available with what subscribers are willing to pay to watch.

SUMMARY OF THE INVENTION

Briefly stated, in accordance with one aspect of the invention, the foregoing problem is overcome by providing a pay-per-view system for use with a cable television system which allows its subscribers to choose from a greater selection of programs. The pay-per-view system has a video switch that provides program selection by demultiplexing selected programs from a large number of programs at the video switch channels and multiplexing the selected programs into a smaller number of pay-per-view channels that are distributed to the subscribers. Programs may be selected from a large variety of titles and starting times as long as pay-per-view channels are available to transmit the selected programs to the subscribers making the selections. After a program is selected by a request from one subscriber, other subscribers making the same request may be added as pay-per-view subscribers for that program. This pay-per-view system has a program schedule channel, which lists programs that are available for pay-per-view, selection and their scheduled starting times. To provide the pay-per-view subscribers with the large variety of choices, the number of different programs available for selection exceeds the number of pay-per-view channels for transmitting pay-per-view programming. When the number of different selections made by the pay-per-view subscribers reaches the total number of pay-per-view channels, no more new programs can be selected. The price of a large selection variety is the possibility of blocking. If blocking occurs frequently, it can be solved by dividing the subscribers into different cable television distribution areas with each area served by such a pay-per-view system. By dividing the number of subscribers per pay-per-view system, the probability of pay-per-view blocking is reduced.

In a specific embodiment, the problem of known pay-per-view systems are overcome by providing a pay-per-view system which includes a conductor that carries M different pay-per-view programs. The pay-per-view system also includes a device that allows pay-per-view subscribers to select a maximum of N different pay-per-view programs from the M different pay-per-view programs, where N is the number of pay-per-view channels available to the subscribers and N is less than M. The pay-per-view system further includes a device for communicating to each respective television set of each of the pay-per-view subscribers a respective pay-per-view program which the subscriber selected. To bill each pay-per-view subscriber, the pay-per-view system also has a device for billing subscribers for the pay-per-view program which the subscriber selected. To prevent viewing by non-pay-per-view cable television subscribers, each program communicated is scrambled and only the pay-per-view subscribers have messages transmitted to their set top boxes enabling their descramblers therein.

It is an object of the present invention to provide a pay-per-view system where the subscribers select the pay-per-view programs that they want to watch from a large variety of available programs.

It is another object of the invention to provide a pay-per-view system that dynamically determines its schedule of programs from contemporaneous subscriber selections and displays this schedule in a dynamically updated program schedule that is sent to each potential pay-per-view subscriber.

BRIEF DESCRIPTION OF THE DRAWING

While the specification concludes with the appended claims particularly pointing out and distinctly claiming the subject matter which is regarded as the invention, it is believed that the invention will be better understood from the following description taken in conjunction with the accompanying drawings in which:

DETAILED DESCRIPTION

In the description of the figures, like reference numbers signify like items throughout the figures. Likewise, similar reference numbers signify similar but not identical items throughout the figures.

Figure 1:
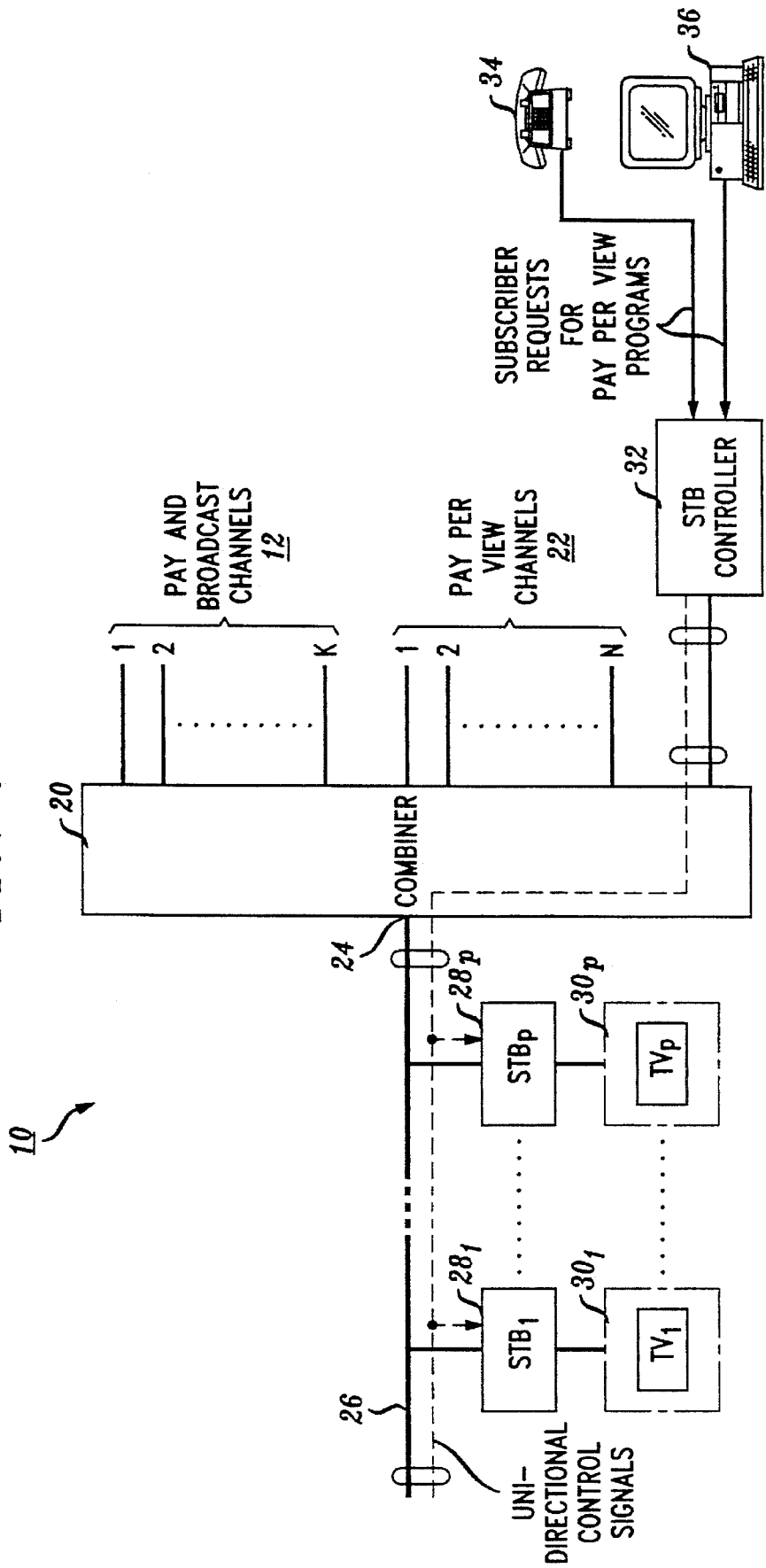
FIG. 1 is a block diagram of a known pay-per-view system that is a sub-system of a cable television system having other programming available to subscribers.

Referring now to FIG. 1, a cable television system 10 is shown. Cable television system 10 has K channels 12 that are dedicated to pay and broadcast television programming. The pay and broadcast channels 12 are typically supplied from outputs of satellite links located at a cable television system office (not shown). The pay and broadcast channels 12 are typically directly connected from outputs of satellite links to a linear combiner 20.

Cable television system 10 also has N channels 22 dedicated to pay-per-view programming. Pay-per-view programming is often supplied by a satellite link the same as the pay and broadcast programming is supplied. The pay-per-view channels 22 are also typically supplied by direct connections from outputs of satellite links to combiner 20.

The inputs to combiner 20 are already located on different frequencies, so the combiner sums them to obtain a frequency multiplexed signal that contains the pay television programming, the commercial and non-commercial broadcast programming and the pay-per-view programming. To prevent subscribers to only the broadcast programming from viewing pay or pay-per-view programming, pay television program signals and pay-per-view program signals may be scrambled before they enter the combiner 20. An output 24 of the combiner 20 is connected to a conductor 26 which is the cable that distributes the frequency multiplexed signal to all the cable television subscribers. Conductor 26 may be a broadband electrical cable or it may be an optical fiber cable, depending upon the technology used by the local cable television system.

The cable television subscribers have set top boxes (STB) $28_1$–$28_p$, typically supplied by the cable television company, which are connected between the conductor 26 and their television sets $30_1$–$30_p$. Each set top box $28_1$–$28_p$ has an identification code such that it can be addressed and instructed by equipment of the cable television system 10.

One use of this addressing and instructing capability is the selective enabling of descramblers within each set top box $28_1$–$28_p$ to descramble the pay television or pay-per-view programming for which the subscriber has paid. A STB controller 32 transmits the enabling signals, which are represented in FIG. 1 by dashed lines, to the set top boxes $28_1$–$28_p$ of pay-per-view subscribers to enable the descrambling of the channels that the subscribers selected for viewing.

STB controller 32 receives subscriber requests by telephone 34, computer data 36, or similar input device. Each subscriber must provide some type of identification so the STB controller 32 can lookup the address code for the subscriber's set top box $28_1$–$28_p$. This identification is also required for billing. The subscriber must also identify the channel, i.e. the program, that he or she wants to watch. The program schedule for the N pay-per-view channels 22 is typically provided on one of the N channels 22 and is not scrambled. Once the subscriber's identity and program selection are obtained, the STB controller 32 transmits a descrambler enabling message to the set top box of the pay-per-view subscriber for the channel of the program he or she selected. This descrambler enable message is transmitted within a dedicated control frequency channel. The subscriber then simply changes the channel of the set top box to the corresponding channel listed in the pay-per-view schedule and watches the selected pay-per-view program. As mentioned before, pay-per-view services typically offer about five different program choices.

Figure 2:
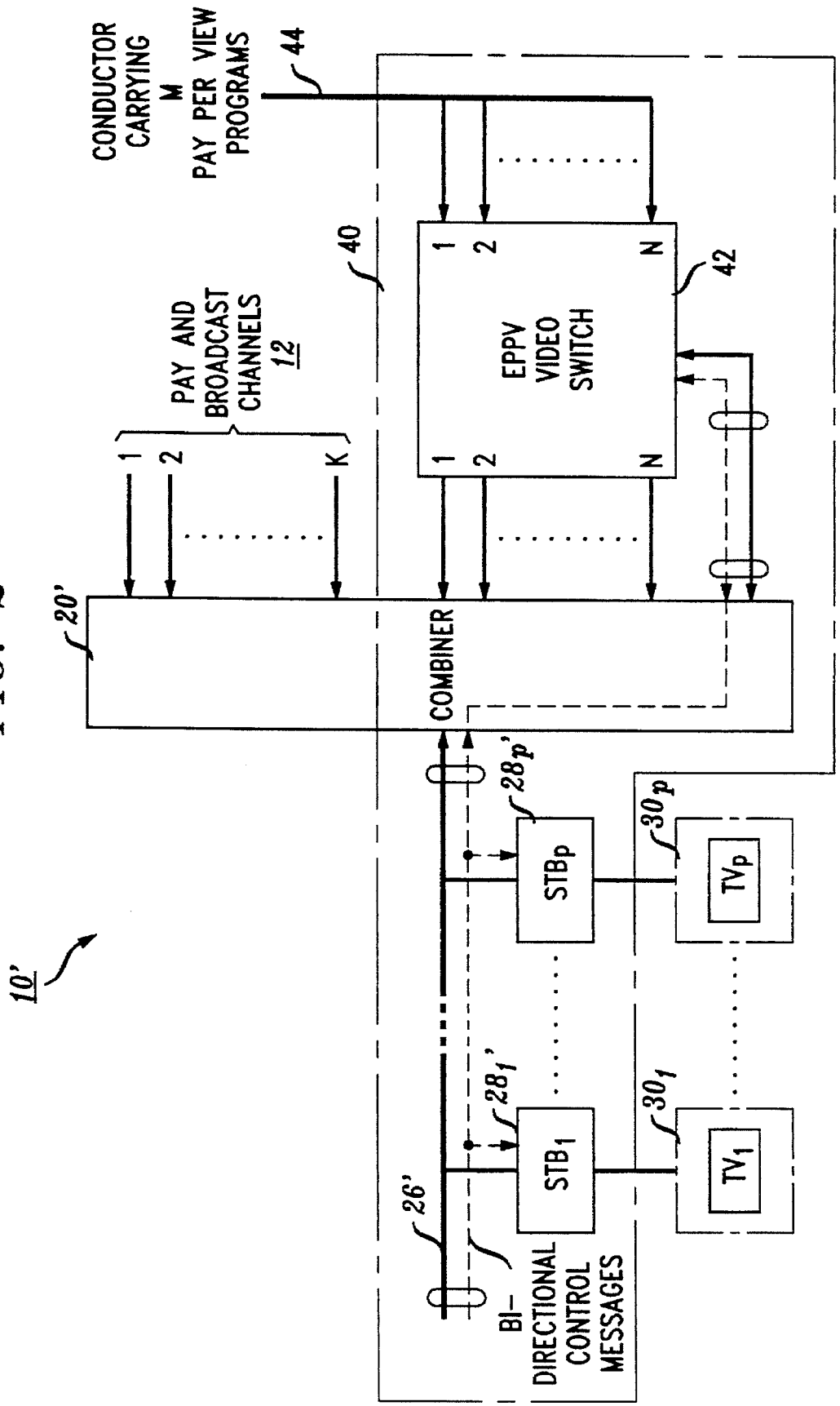
FIG. 2 is a block diagram of an enhanced pay-per-view system according to the present invention as a sub-system of a cable television system.

Referring now to FIG. 2, a cable television system 10' with an enhanced pay-per-view (EPPV) system 40 is shown. Cable television system 10' like cable television system 10 shown in FIG. 1, has K channels 12 that are dedicated to pay and broadcast television programming. The pay and broadcast channels 12 are supplied and connected in the same manner as known from the description of FIG. 1.

The EPPV system 40 of cable television system 10' has an EPPV video switch 42 which provides most of the enhanced capabilities of the present invention. EPPV video switch 42 is connected to a pay-per-view programming distribution conductor 44. The connection may be made by multiple taps to the N inputs of EPPV video switch 42 as shown, or EPPV video switch 42 may be connected by a single connection to conductor 44 and a distribution network within video switch 42 would then be included (not shown).

Conductor 44 carries a number, M, of multiplexed EPPV programs. Conductor 44, as conductor 26 described above, may be an electrical cable or a fiber optic cable. The M EPPV programs may be frequency division multiplexed, time division multiplexed, or have some other type of multiplexing, such as multiplexing based on asynchronous transfer mode packets. EPPV video switch 42 is an N channel demultiplexer which selectively switches up to a number N of the M programs on conductor 44 to N. The N outputs of EPPV video switch 42 are connected to combiner 20'. For the purposes of this description, one entertainment feature that is offered at different times on two EPPV channels is considered two different programs. This is because the scheduled times are directed to two different sets of subscribers. Thus, a popular movie might be offered at four different start times staggered at 15 minute intervals across multiple channels to accommodate more viewers' schedules. By definition, each of the four time shifted offerings of this movie is considered to be a different program.

Which of the N or less programs of the M EPPV programs on conductor 44 are switched to combiner 20' is determined by the EPPV subscribers. The subscribers' set top boxes $28_1'$–$28_p'$ the capabilities of the set top boxes shown in FIG. 1, with the additional capability to communicate control signals back along conductor 26' for EPPV program selection purposes. Set top boxes with similar capabilities are known and have been used in some cable television systems for home shopping or similar applications. So, for example, if a subscriber who owns television $30_1$ wants to select an EPPV program, he or she operates set top box $28_1'$ to receive the EPPV program schedule. The EPPV program schedule then lists the EPPV programs that are available for viewing. Next, the subscriber operates set top box $28_1'$ to select one of the available EPPV programs. A selection message identifying the set top box making the selection and identifying the program selected is transmitted from set top box $28_1'$ back along conductor 26', through combiner 20' to EPPV video switch 42. Combiner 20' has all the capabilities of combiner 20 shown in FIG. 1 and the additional capability of conveying control signals from the set top boxes $28_1'$–$28_p'$ to the EPPV video switch 42. The subscriber's selection is processed within the EPPV video switch 42 and if one of the N channel is available (and this program has not been selected previously) the selected program will be demultiplexed from the M programs multiplexed on conductor 44 and switched to the available channel for viewing by the subscriber.

Figure 3:
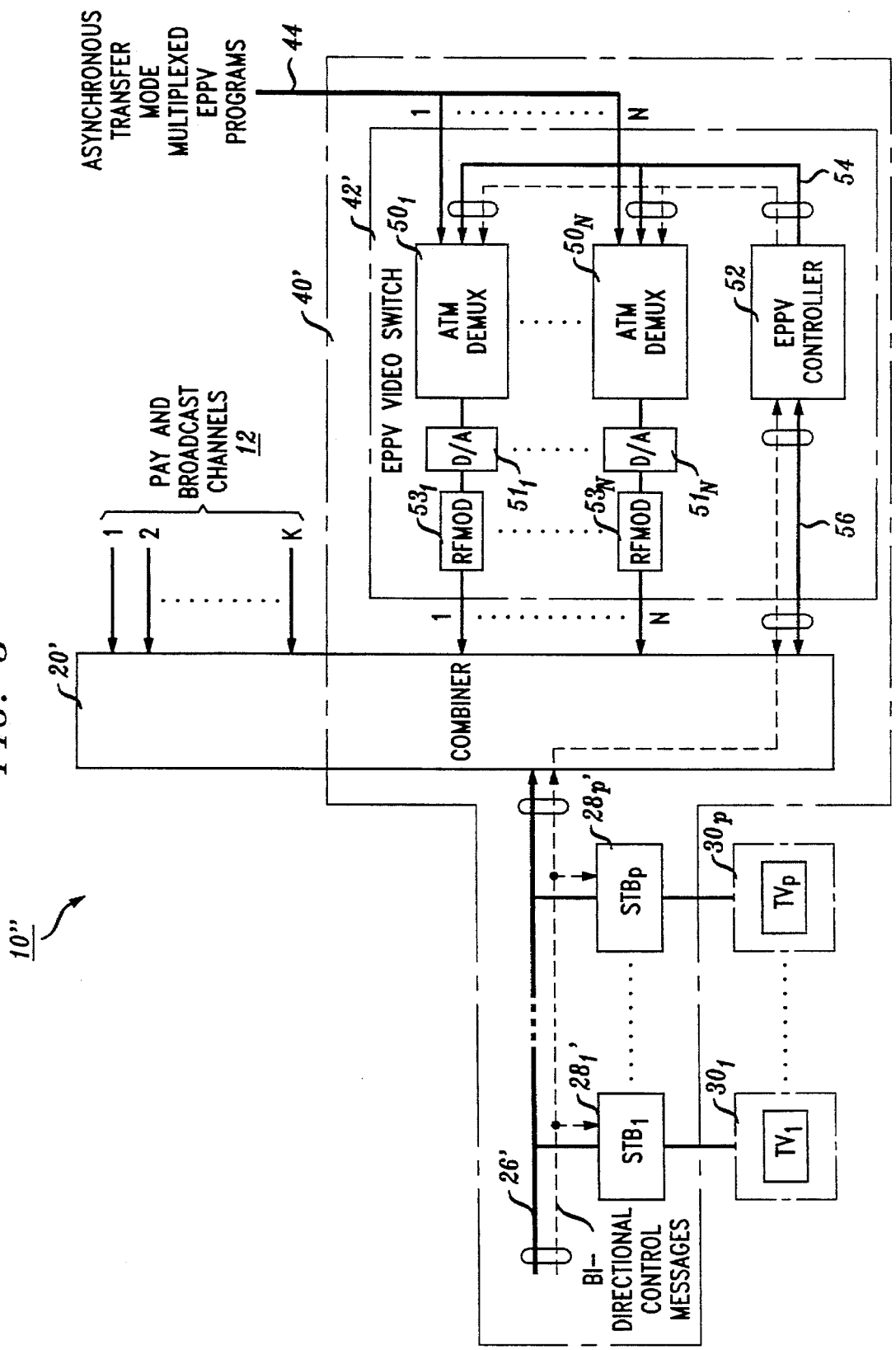
FIG. 3 is a block diagram of an asynchronous transfer mode (ATM) packet data multiplexed pay-per-view system as a sub-system of a cable television system.

FIG. 3 shows, in block diagram form, details of an EPPV system 40' which is an embodiment of the invention that is used if the M programs on conductor 44 are multiplexed using asynchronous transfer mode packets. EPPV video switch 42' has N ATM demultiplexers $50_1$–$50_N$, each having an ATM packet data input connected to conductor 44. Each of the ATM demultiplexers $50_1$–$50_N$ also has a control input connected to EPPV controller 52 via a common control bus 54. Each of the ATM demultiplexers $50_1$–$50_N$ has an output that is connected to a digital-to-analog converter $51_1$–$51_N$, which converts the digital bit stream from ATM demultiplexers $50_1$–$50_N$ to an analog signal. The signal at the output of each of the digital-to-analog converters $51_1$–$51_N$, is an analog television signal at a standard frequency, assuming that the demultiplexer to which it is connected is active and not idle. The outputs of digital-to-analog converters $51_1$–$51_N$ are connected to respective radio frequency modulators $53_1$–$53_N$. The radio frequency modulators $53_1$–$53_N$ each translate, i.e. modulate, the fixed output frequency of their respective digital-to-analog converters $51_1$–$51_N$ to one of the N channels dedicated to the EPPV service, assuming again that the respective ATM demultiplexer $50_1$–$50_N$ is not idle. Scrambling to prevent free viewing of pay-per-view programming may be done either in the output portion of digital-to-analog converters demultiplexers $51_1$–$51_N$, or in radio frequency modulators $53_1$–$53_N$.

The EPPV controller 52 oversees and controls the selection process within EPPV video switch 40'. Upon receiving a program selection from one of the set top boxes via conductor 56, EPPV controller 52 processes the selection to provide the actions necessary to deliver the program to the subscriber making the selection.

If this is the first time that this EPPV program has been selected by a subscriber and there is an EPPV channel available, EPPV controller 52 assigns a channel from a list of EPPV channels that are idle. This assignment automatically defines which of the ATM demultiplexers $50_1$–$50_N$ is to demultiplex the selected program. Next, EPPV controller 52 looks up the ATM packet address for the selected program and sends a control signal instructing the defined ATM demultiplexer to demultiplex (and decompress if digital compression is used) the selected program from all the EPPV programs on conductor 44. After the defined ATM demultiplexer, the respective digital-to-analog converter and radio frequency modulator automatically process the selected program, transmit it on the assigned EPPV channel on conductor 26', and scramble it to prevent viewing by non-EPPV subscribers. Preferably, EPPV controller 52 next transmits a control message forcing the set top box of the subscriber making this selection to tune to the assigned EPPV channel, and subsequently transmits a control message to that same set top box to enable the descrambling of the assigned channel. Alternatively, the subscriber making the selection stays tuned to the EPPV program schedule channel which is updated by EPPV controller 52 to show the assigned channel for the selected program. Noting this, the subscriber now selects the assigned channel on his or her set top box. After the subscriber tunes the set top box to the assigned channel and the subscriber's set top box receives the enable descrambling control message, the subscriber can view the selected program. In either case, the EPPV controller 52 next records a billing for the selected program to the selecting subscriber. With automated equipment, all of these operation can be performed in fractions of a second.

If the selecting subscriber is not the first selecting subscriber, then an EPPV channel is already assigned and the ATM demultiplexer is already defined and operating. In this case, preferably, EPPV controller 52 transmits a control message forcing the set top box of the subscriber making this selection to tune to the assigned EPPV channel, and subsequently transmits a control message to that same set top box to enable the descrambler. Alternatively, the subscriber making the selection stays at an EPPV program schedule channel which is updated by EPPV controller 52 to show the assigned channel for the selected program, at which time the subscriber tunes his or her set top box to the assigned channel. Next, EPPV controller 52 transmits a control message to that same set top box to enable the descrambler for the assigned channel. Then the program is available for the second and subsequent subscribers to view on his or her television set. Finally, the EPPV controller 52 records a billing to each selecting subscriber for the selected program.

Figure 4:
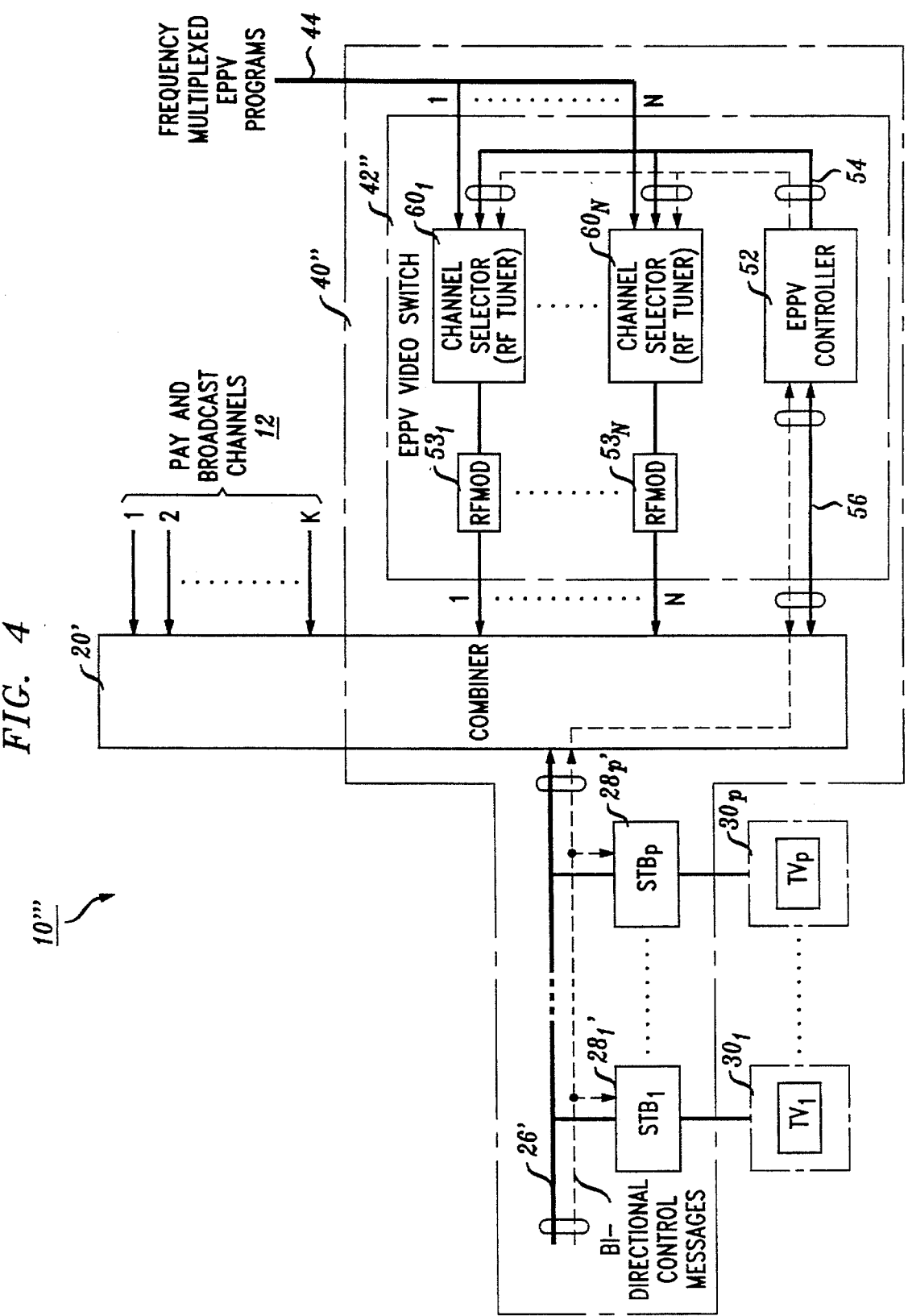
FIG. 4 is a block diagram of a frequency multiplexed pay-per-view system as a sub-system of a cable television system.

Referring now to FIG. 4, a block diagram of another embodiment of the invention is shown. The differences between EPPV system 40" shown in this figure and EPPV system 40' shown in FIG. 3 are all related to the fact that EPPV system 40" is connected to M programs on conductor 44 that are frequency multiplexed, not ATM packet multiplexed. Thus, EPPV video switch 42" has N channel selectors $60_1$–$60_N$ instead of ATM demultiplexers. Each of the channel selectors $60_1$–$60_N$, is a radio frequency tuner that selectively tunes any one of the M analog television channels multiplexed on conductor 44 according to a digital tuning message received from EPPV controller 52. Channel selectors $60_1$–$60_N$ translate their input signals to a standard output frequency band, in a similar manner to the standard output frequency of digital-to-analog converters $51_1$–$51_N$. Because of this, no changes are necessary to radio frequency modulators $53_1$–$53_N$ and the remainder of the EPPV system 40". Further, the operation of EPPV controller 52 is essentially the same, the only differences being minor changes in addresses and control words used by the channel selectors when compared to the addresses and control words used by the ATM demultiplexers. As far as EPPV controller 52 is concerned, EPPV systems 40" and 40' are operationally equivalent. This means the procedure for selecting an EPPV program for EPPV system 40" will be the same as described above with regard to EPPV system 40', except that channel selectors 60₁–60ₙ will tune analog channels instead of ATM demultiplexer demultiplexing programs from ATM packets.

Figure 5:
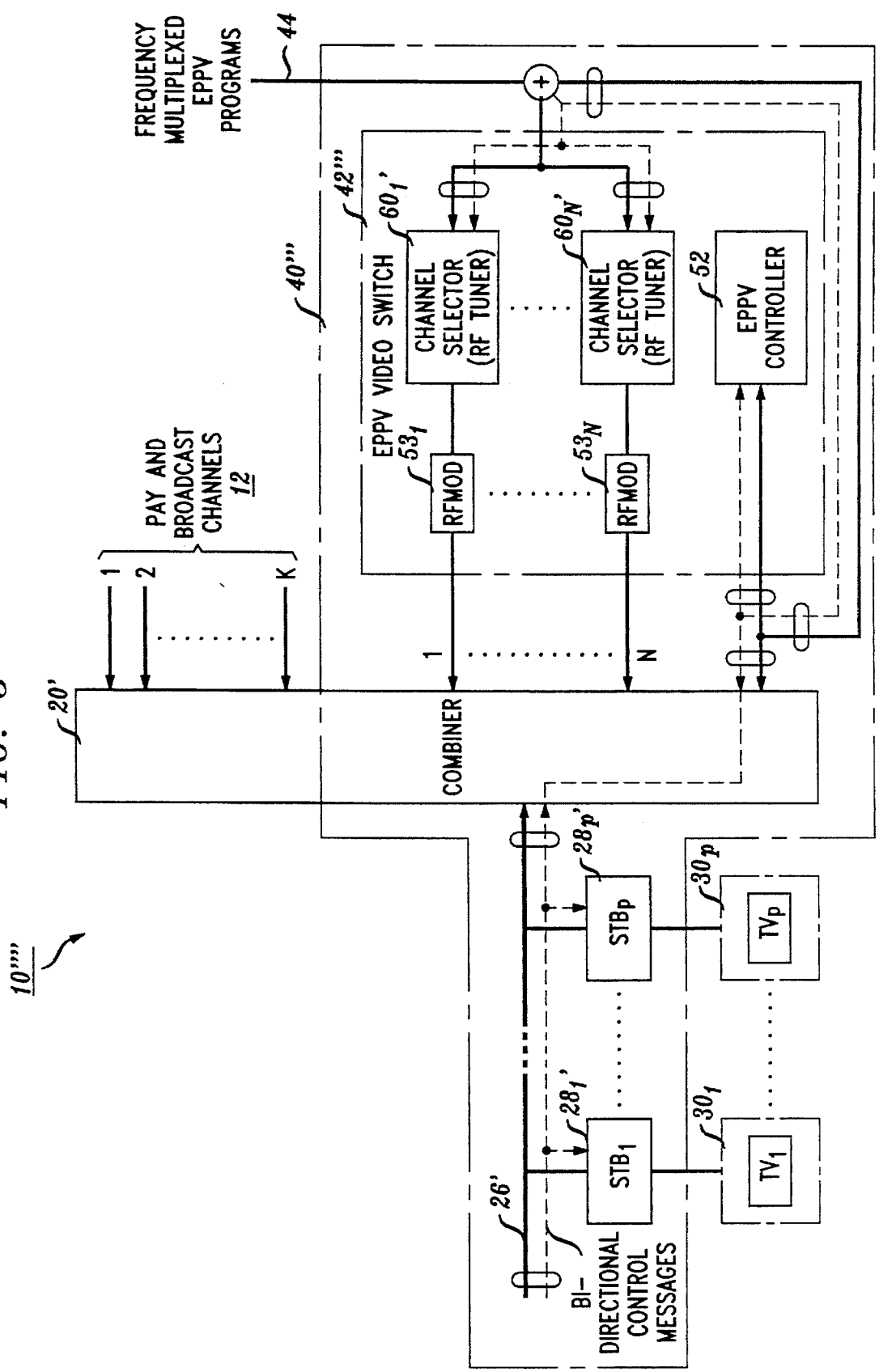
FIG. 5 is a block diagram of an alternative frequency multiplexed pay-per-view system as a sub-system of a cable television system.
Figure 6:
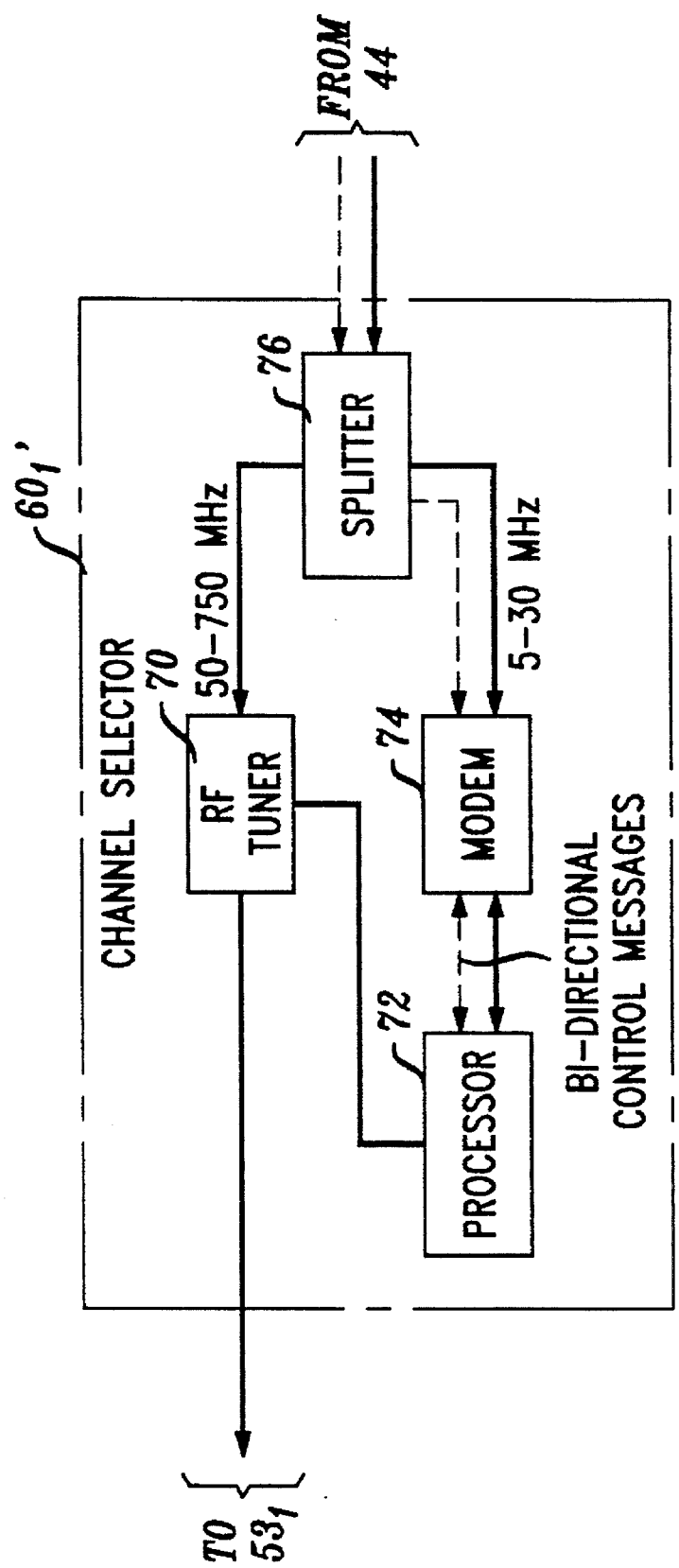
FIG. 6 is a block diagram showing internal details of the channel selector shown in FIGS. 5 and 7.

Referring now to FIGS. 5 and 6, another embodiment of the present invention is shown. Functionally, the EPPV system 40''' is equivalent to the EPPV system 40" shown in FIG. 4. The differences between EPPV system 40''' and EPPV system 40" are related to the fact that EPPV system 40''' does not have separate control buses between the EPPV controller 52' and the channel selectors 60₁'–60ₙ' as EPPV system 40" has. Instead EPPV controller 52' uses the same interface to communicate with the channel selectors 60₁'–60ₙ' as it uses to communicate with the set top boxes 28₁'–28ₚ'. Thus, EPPV controller 52' is simpler and less expensive than its counterparts shown in FIGS. 3 and 4.

The channel selectors 60₁'–60ₙ', on the other hand, are more complex. One example of the channel selectors 60₁'–60ₙ' channel selector 60₁', is shown in FIG. 6. Channel selector 60₁' has an RF tuner 70, and a processor 72 for controlling the tuner to tune different channels to receive EPPV analog television signals. This element would essentially be identical to its counterparts channel selector 60₁ of FIG. 4. Channel selector 60₁' also has a modem 74, which would be different than its counterpart in channel selector 60₁, because modem 74 demodulates a radio frequency control signal to receive its control instructions, while channel selector 60₁ uses an Ethernet or similar baseband data demodulator to receive control signals. Unlike the channel selector 60₁, channel selector 60₁' has a frequency splitter which splits the combined. EPPV programming signals and EPPV control signals into their respective bands and conveys the analog television channels to the radio frequency tuner 70 and the radio frequency control band to the modem 74. By using the channel selectors 60₁'–60ₙ', an extra set of interfaces and cables may be deleted without functionally changing the operation of the EPPV system 40'''.

Figure 7:
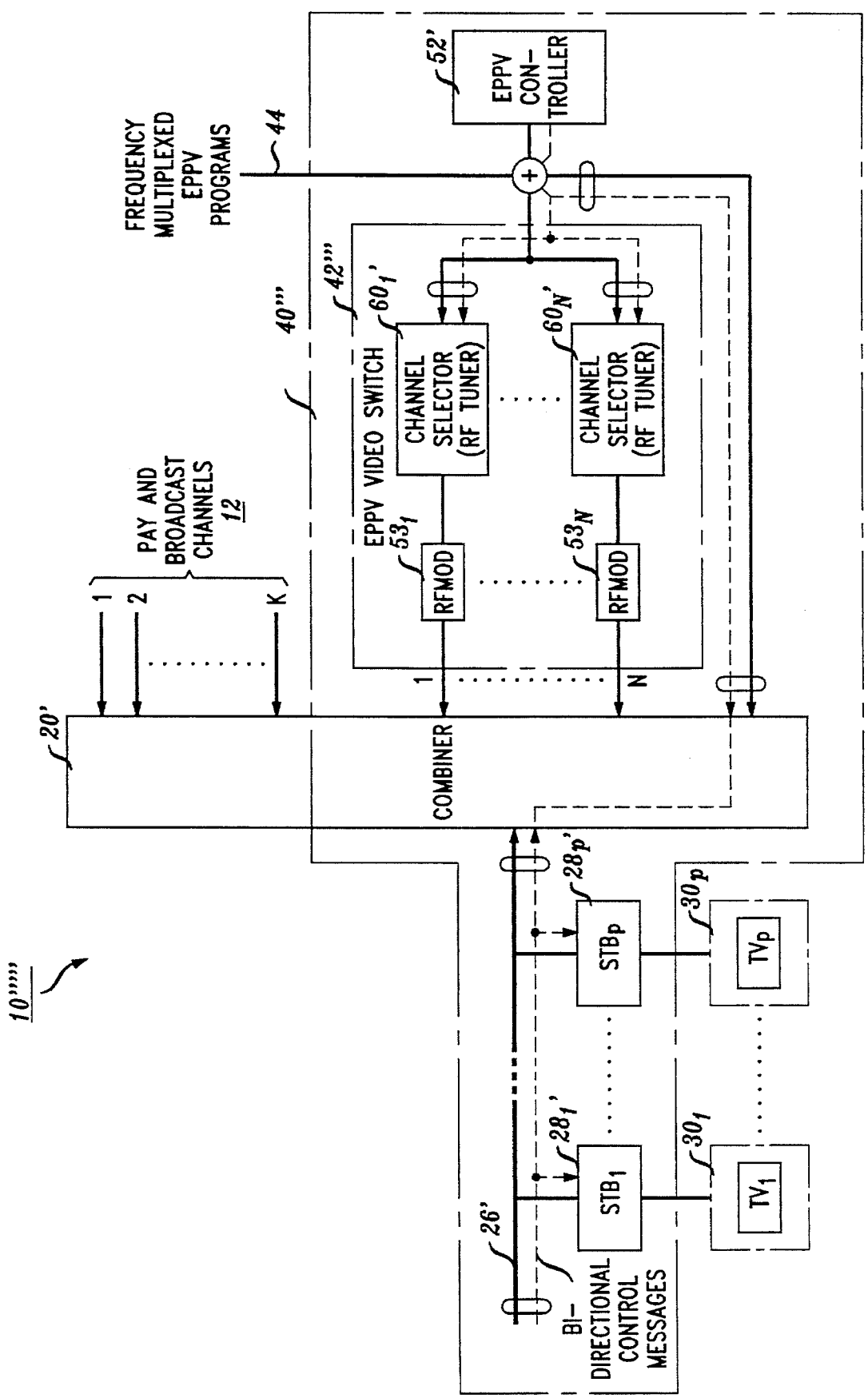
FIG. 7 is a block diagram of the frequency multiplexed pay-per-view system as shown in FIG. 5 except having a controller that is external to the enhanced pay-per-view switch.

Referring now to FIG. 7, another embodiment of the invention is shown. EPPV system 40'''' is essentially the same as EPPV system 40''' shown in FIG. 5; the difference being, EPPV controller 52' has been located outside of the EPPV video switch 42''''. With this configuration, the subscribers could be divided up between multiple EPPV systems 40'''' and 40A. Dividing the subscriber between multiple EPPV system 40''' and 40A has the advantage of reducing the number of subscribers per EPPV channel as mentioned previously. Further, control all of the EPPV systems 40'''' and 40A can be maintained by a single EPPV controller 52' connected to conductor 40. This reduces the cost of controller for the cable television system and also allows the billing device, i.e. EPPV controller 52', to be located in the cable office instead of at a less protected neighborhood distribution site.

Thus, it will now be understood that there has been disclosed an enhanced pay-per-view system. While the invention has been particularly illustrated and described with reference to preferred embodiments thereof, it will be understood by those skilled in the art that various changes in form, details, and applications may be made therein. For example, the conductor that carries all of the pay-per-view programs before a sub-set thereof is selected may be a broadband radio frequency conductor or it may be an optical conductor. It is accordingly intended that the appended claims shall cover all such changes in form, details and applications which do not depart from the true spirit and scope of the invention.

What is claimed as new and desired to be secured by Letters Patent of the United States is:

1. A pay-per-view system, comprising:

a conductor having a plurality of pay-per-view programs that are available for selection by a subscriber;

each of said plurality of pay-per-view programs is represented by respective pay-per-view program signals, the plurality of pay-per-view program signals are multiplexed together and transmitted via said conductor;

a bi-directional local distribution area cable;

a plurality of set top boxes each having a bi-directional connection to said bi-directional local distribution area cable, each of said plurality of set top boxes having means for selecting a pay-per-view program from said plurality of pay-per-view programs;

a plurality of demultiplexers, each of said demultiplexers demultiplexing program signals of a program that has been selected by a subscriber from said plurality of pay-per-view programs and converting each of said demultiplexed program signals into respective analog television signals;

each of said demultiplexers having:
    an input connected to said conductor;
    an output for transmitting respective analog television signals; and
    a control input for controlling the demultiplexing of the plurality of multiplexed pay-per-view program signals to demultiplex its respective pay-per-view program therefrom;

a controller connected to each of said demultiplexers for individually controlling which pay-per-view program signals are demultiplexed thereby;

a plurality of frequency modulators, each having an input connected to a respective output of said plurality of demultiplexers for receiving the respective analog television signals therefrom, means for modulating the respective analog television signals to a specific channel, and an output for transmitting the modulated analog television signals;

a combiner having a plurality of inputs, each connected to an output of a respective frequency modulator for combining the modulated analog television signals in their respective channels; said combiner transmitting this combined signal via a bi-directional port thereof to said local distribution area cable;

each of said plurality of set top boxes having means for communicating its respective selected program selection by said bi-directional local area distribution cable to said controller so said controller can control one of said plurality of demultiplexers to demultiplex said selected pay-per-view program;

each of said plurality of set top boxes having an output connected to a respective television equipment; and each set top box converting the respective modulated analog television signals of its respective selected pay-per-view program to signals that may be received on the respective television equipment connected to the set top box;

wherein said selected pay-per-view program is switched to a channel of the local distribution area cable contemporaneously with its selection.

2. The pay-per-view system of claim 1, wherein each of said frequency modulators scrambles the analog television signal that it modulates in order to prevent unscrambled viewing by non pay-per-view subscribers for that program.

3. The pay-per-view system of claim 2, wherein said controller sends a message to each set top box of a pay-per-view subscriber to descramble the respective channel on which the selected program signals is transmitted.

4. The pay-per-view system of claim 3, wherein said controller also includes means for billing each pay-per-view subscriber for the pay-per-view programs selected.

5. A pay-per-view system for use with a television cable system, comprising:

a first plurality of pay-per-view programs that run in real time from which a second plurality of pay-per-view programs are selected;

a plurality of pay-per-view channels of the cable system for delivering up to a number equal to said second plurality of pay-per-view programs thereby;

the number of different programs in said first plurality is greater than the number of channels in said plurality of pay-per-view channels;

means for selecting one of said plurality of pay-per-view programs for delivery by one of said plurality of pay-per-view channels if one of said plurality of pay-per-view channels does not currently have a pay-per-view subscriber; and means for displaying a contemporaneously updated schedule of programs that have been selected by subscribers for delivery upon channels of said plurality of channels which may be selected for viewing by another pay-per-view subscriber.

6. The pay-per-view system of claim 5, further comprising:

means for displaying said first plurality of pay-per-view programs available for selection for delivery if at least one of said plurality of channels is unoccupied.

7. A pay-per-view system for use with a television cable system, comprising:

a first plurality of pay-per-view programs that run in real time from which a second plurality of pay-per-view programs are selected by subscribers;

a plurality of pay-per-view channels of the cable system for delivering up to a number equal to said second plurality of pay-per-view programs thereby;

the number of different programs in said first plurality is greater than the number of channels in said plurality of pay-per-view channels;

means for selecting one of said first plurality of pay-per-view programs for delivery by one of said plurality of pay-per-view channels if one of said plurality of pay-per-view channels is not presently occupied by one of said second plurality of pay-per-view programs; and means for transmitting to a television signals which cause a display of a contemporaneously updated schedule for each of said second plurality of pay-per-view programs.

* * * * *